US009223378B2

(12) United States Patent
Ng et al.

(10) Patent No.: US 9,223,378 B2
(45) Date of Patent: Dec. 29, 2015

(54) SENSING CURRENT TO PROTECT A FUSE

(71) Applicant: HEWLETT-PACKARD DEVELOPMENT COMPANY, L.P., Houston, TX (US)

(72) Inventors: Kay Seah Ng, Singapore (SG); Kah Hoe Ng, Singapore (SG); Koh Yew Thoon, Singapore (SG)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 387 days.

(21) Appl. No.: 13/627,578

(22) Filed: Sep. 26, 2012

(65) Prior Publication Data

US 2014/0089698 A1 Mar. 27, 2014

(51) Int. Cl.
G06F 1/26 (2006.01)
G06F 1/32 (2006.01)

(52) U.S. Cl.
CPC .............. G06F 1/3206 (2013.01); G06F 1/324 (2013.01); Y02B 60/1217 (2013.01)

(58) Field of Classification Search
CPC .......... G06F 1/26; G06F 1/324; G06F 1/3296
USPC ...................... 713/300, 322, 324; 714/1, 47.1
See application file for complete search history.

(56) References Cited

U.S. PATENT DOCUMENTS

| 6,367,023 | B2* | 4/2002 | Kling et al. .................... 713/340 |
| 6,498,460 | B1* | 12/2002 | Atkinson ....................... 320/135 |
| 7,010,704 | B2 | 3/2006 | Yang et al. |
| 7,111,178 | B2* | 9/2006 | Rusu et al. .................... 713/300 |
| 7,240,225 | B2* | 7/2007 | Brewer et al. ................. 713/300 |
| 7,307,837 | B2 | 12/2007 | Merkin et al. |
| 8,149,683 | B2* | 4/2012 | Karam .......................... 370/200 |
| 8,228,038 | B2 | 7/2012 | Mullen et al. |
| 8,400,745 | B1* | 3/2013 | Zansky et al. ................. 361/103 |
| 2002/0062454 | A1* | 5/2002 | Fung ............................. 713/300 |
| 2004/0133816 | A1* | 7/2004 | Miyairi et al. ................. 713/300 |
| 2004/0158771 | A1* | 8/2004 | Garnett et al. .................. 714/14 |
| 2005/0086545 | A1* | 4/2005 | Breen et al. .................... 713/300 |
| 2007/0216363 | A1* | 9/2007 | Kawamoto et al. ........... 320/132 |
| 2011/0320849 | A1* | 12/2011 | Cochran et al. ............... 713/340 |
| 2012/0144183 | A1 | 6/2012 | Heinrichs et al. |

OTHER PUBLICATIONS

Hutten, James, et al., Power to Dell PowerEdge M1000e Blade Server Enclosures, Dell, Jun. 2012. < http://i.dell.com/sites/content/business/solutions/whitepapers/en/Documents/pe-m1000e-selection-whitepap er.pdf >.
Spitaels, James, Dynamic Power Variations in Data Centers and Network Rooms, White Paper 43: Revision 3, Schneider Electric's Data Center Science Center, 2005. < http://www.apcmedia.com/salestools/SADE-5TNRK4_R3_EN.pdf >.

* cited by examiner

*Primary Examiner* — Chun Cao
(74) *Attorney, Agent, or Firm* — Hewlett Packard Enterprise Patent Department

(57) ABSTRACT

The speed of a processor is adjusted based on the current sensed by a current sensor in order to protect a fuse from being damaged.

20 Claims, 3 Drawing Sheets

SENSING CURRENT TO PROTECT A FUSE

BACKGROUND

Computing devices, such as switches, routers and servers often comprise a plurality of blades inserted into a chassis. The blade has a processor and provides the desired functionality, while the chassis provides a supporting frame and power supply. In this way many blades can be conveniently fitted into a small area.

A chassis may be designed to support a particular number of blades and/or a particular maximum power for each blade. For example, a chassis may have a fuse which will 'blow' and break the power supply circuit to a blade if it draws too much current.

BRIEF DESCRIPTION OF THE DRAWINGS

Examples will now be described, by way of non-limiting example only, with reference to the accompanying drawings, in which.

DETAILED DESCRIPTION

Figure 1:
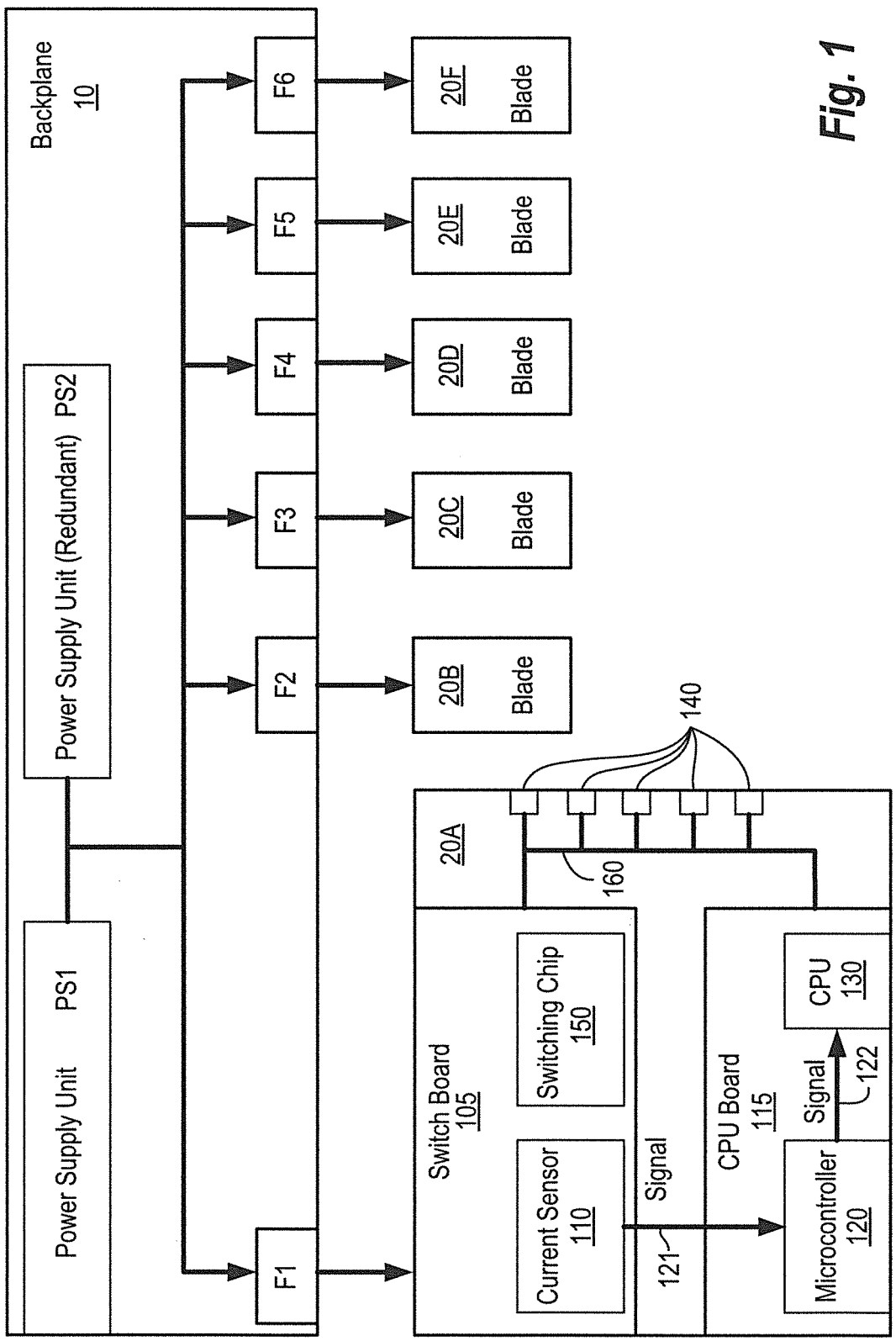
FIG. 1 shows an example of a chassis and a plurality of blades supported by the chassis.

FIG. 1 shows a chassis 10 supporting a plurality of blades 20A, 20B, 20C, 20D, 20E and 20F. A blade is a computing unit which has dedicated functionality and is stackable in a chassis; for example the blade may be a blade server, a networking line card, firewall unit etc.

The chassis 10 provides a physical frame to support the blades and provides electrical power to the blades. While a chassis may have any number of slots, in the illustrated example the chassis has six slots, each for receiving a respective blade. Various arrangements are possible for the power supply; in the illustrated example the chassis has two power supply units: PS1 (a primary power supply) and PS2 (a redundant or back-up power supply). The chassis may also have cooling fans to provide a stream of air to cool the blades via various channels (not shown).

Each blade is associated with a respective main fuse provided in the chassis. Thus in FIG. 1, fuse F1 is associated with blade 20A, fuse F2 is associated with blade 20B, fuse F3 with blade 20C, fuse F4 with blade 20D, fuse F5 with blade 20E and fuse F6 with blade 20F.

Figure 2:
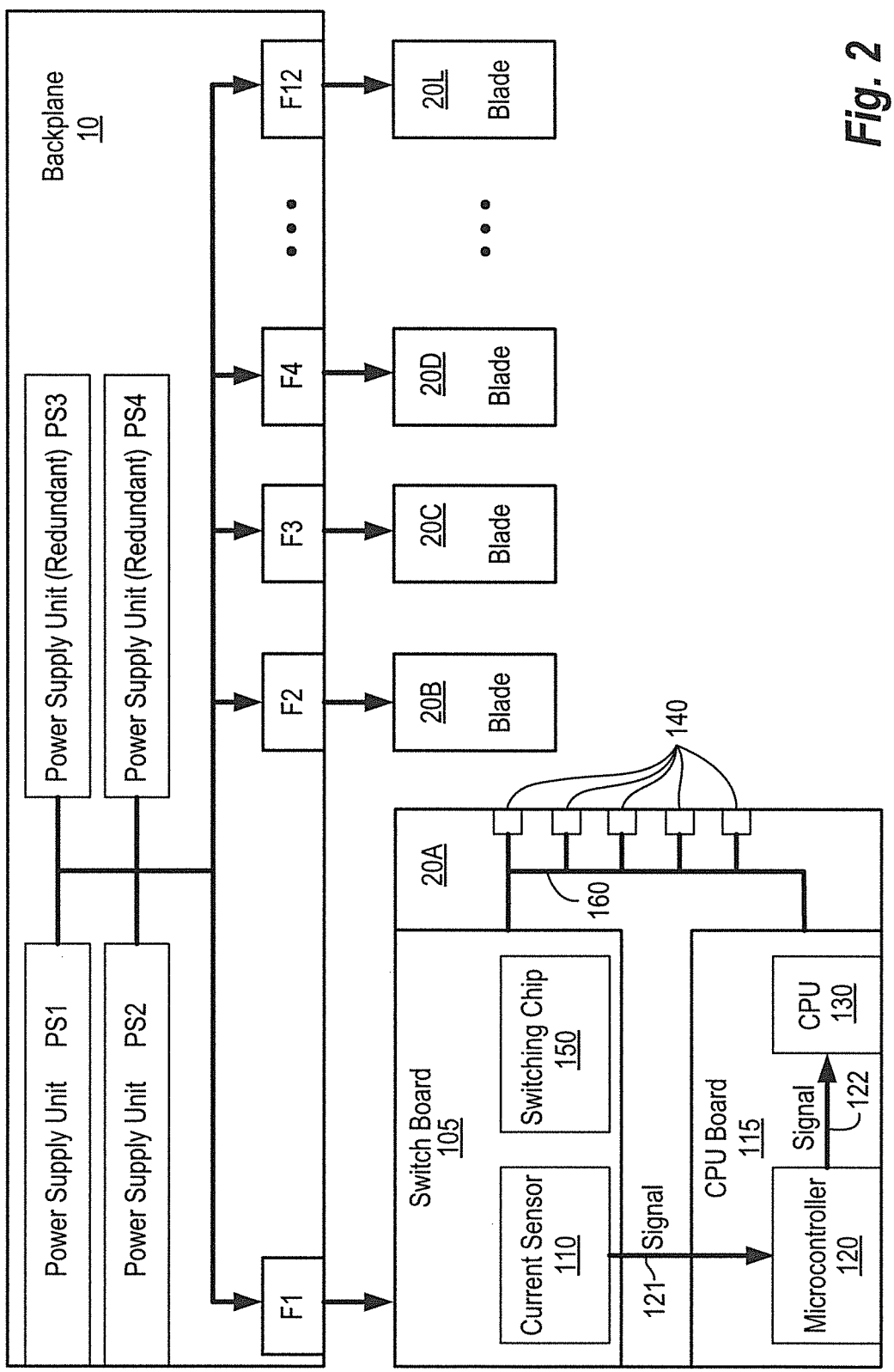
FIG. 2 shows another example of a chassis and a plurality of blades supported by the chassis.

FIG. 2 shows another example which is similar to FIG. 1, but which has twelve blades. In interest of clarity, only the first 20A, second 20B, third 20C, fourth 20D and twelfth 20L blades are shown in FIG. 2. The same as in FIG. 1, each blade is received in a respective blade slot and associated with a respective fuse in the chassis. So fuse F1 is associated with blade 20A, fuse F2 with blade 20B, fuse F3 with blade 20C, fuse F4 with blade 20D and fuse F12 with blade 20L etc. In the example of FIG. 2 there are four power supply units: two primary power supply units PS1 and PS2 and two redundant or backup power supply units PS3 and PS4. In the illustrated arrangement the power supplied by the active units is pooled and shared between all the blades; however in other arrangements certain power supply units may be associated with only some of the blade slots.

According to the present disclosure, each fuse is located between the power supply and the power input of the blade it is associated with. The fuses are in the chassis, for example they may be located on a backplane board of the chassis. The fuses help to protect the blades from damage, and/or prevent possible fire due to overheating, by 'blowing' thereby cutting the power supply to the blade if too much current is drawn. The fuse comprises an element which is damaged or destroyed when too much current is passed thereby 'blowing' and cutting the circuit. As such it is not re-settable and must be replaced if blown.

It follows from the above that if a fuse in the chassis blows it has to be replaced, resulting in significant downtime for the blade it is connected to. In some cases replacement of a fuse may result in downtime for the entire chassis.

A chassis is typically used by a customer for many years; while blades may be purchased separately and typically have a shorter life cycle. A customer may buy new or replacement blades from time to time according to the needs of the business. As technology progresses, the current trend is towards more complicated and powerful blades which draw more power. However due to safety, design, and other considerations, it is not a simple matter to replace the chassis fuse with a higher one. Therefore, the new or replacement blade needs to work within the parameters of the chassis; in particular if a blade draws too much current it may blow the chassis fuse associated with the blade slot. This presents a challenge if a new blade with higher power components is used with an older chassis having fuses designed for blades with lower power components.

FIGS. 1 and 2 show an example of the configuration of one of the blades (the first blade 20A) in more detail. For simplicity the configuration of the other blades is not shown, but it is understood it may be the same or different and in particular if they have lower power components the other blades may in some cases not have the logic circuitry for protecting the fuse which is described in more detail below.

Referring to FIGS. 1 and 2, the blade comprises a current sensor 110 which is connected to a power input of the blade and operable to sense the current drawn by the blade, a processor such as a CPU 130 and logic circuitry 120 to send control signals to the processor based on the current sensed by the current sensor 110. In the present example the logic circuitry is a microcontroller and will be referred to as such hereinafter. However, any appropriate form of logic circuitry may be used. The current sensor is configured to output a signal to the logic circuitry via a first communication line 121 and the logic circuitry is arranged to output a signal to the processor via a second communication line 122. In the following description it is assumed that the processor is a CPU, although in some implementations another type of processor may be used instead.

The blade may have other components in addition to those mentioned above. In the illustrated example the blade acts as a line card for a router or switch and has a plurality of communication interfaces 140 (e.g. Ethernet ports) and a switching chip 150. The switching chip 150 comprises a processor such as an ASIC, FPGA or similar for handling routing of packets, access control and a memory such as TCAM or DRAM for storing a routing table. The CPU 130 handles more complicated routing or switching functionality such as VLANs and updating and configuring of the routing table and switching chip processor. The communication interfaces 140 may be connected to the switching chip 150 and CPU 130 by a bus 160 or otherwise.

In the illustrated example the current sensor 110 and switching chip 150 are on a first board 105 (e.g. the 'switching chip board'), while the logic circuitry 120 and CPU 130 are on a second board 115 (e.g. the CPU motherboard). However, in other examples they could all be on the same board, or distributed among a greater number of boards and the current sensor 110 and logic circuitry 120 may be on the same board or on different boards to that shown in FIGS. 1 and 2. While the example of a line card has been discussed above, the blade may be another type of dedicated computing device, such as a blade server, firewall device, wireless access controller etc.

In one example the CPU is a processor which is capable of running a general computing Operating System (OS) such Windows, Unix, Apple OS, or Linux etc. For example the CPU may be an x86 type CPU. Such CPUs are in general more powerful than the specialized CPUs used on conventional routers or switches, and may allow extra functionality so that the blade can act as a firewall, DHCP server, network storage, wireless access controller, security server etc. Such CPUs also typically draw more power than the specialized CPUs used on conventional routers or switches.

The theoretical total maximum power drawn by the blade will be equal to the maximum power drawn by the CPU and the maximum power drawn by the other components of the blade (e.g. the switching chip 150 in FIGS. 1 and 2).

If the total maximum power results in the blade drawing a current above a 'safe' threshold, then there is a risk that the corresponding chassis fuse will be damaged and blow, either immediately or at an unpredictable time in the future.

The blade therefore has a mechanism to protect the fuse. The logic circuitry 120 controls the processor (e.g. CPU) 130 speed on the basis of the current sensed by the current sensor. For example the logic circuitry may cause the processor to reduce its speed (e.g. by reducing its operating frequency) when the current sensor detects that the current drawn by the blade has passed a threshold above which the fuse may be damaged.

Figure 3:
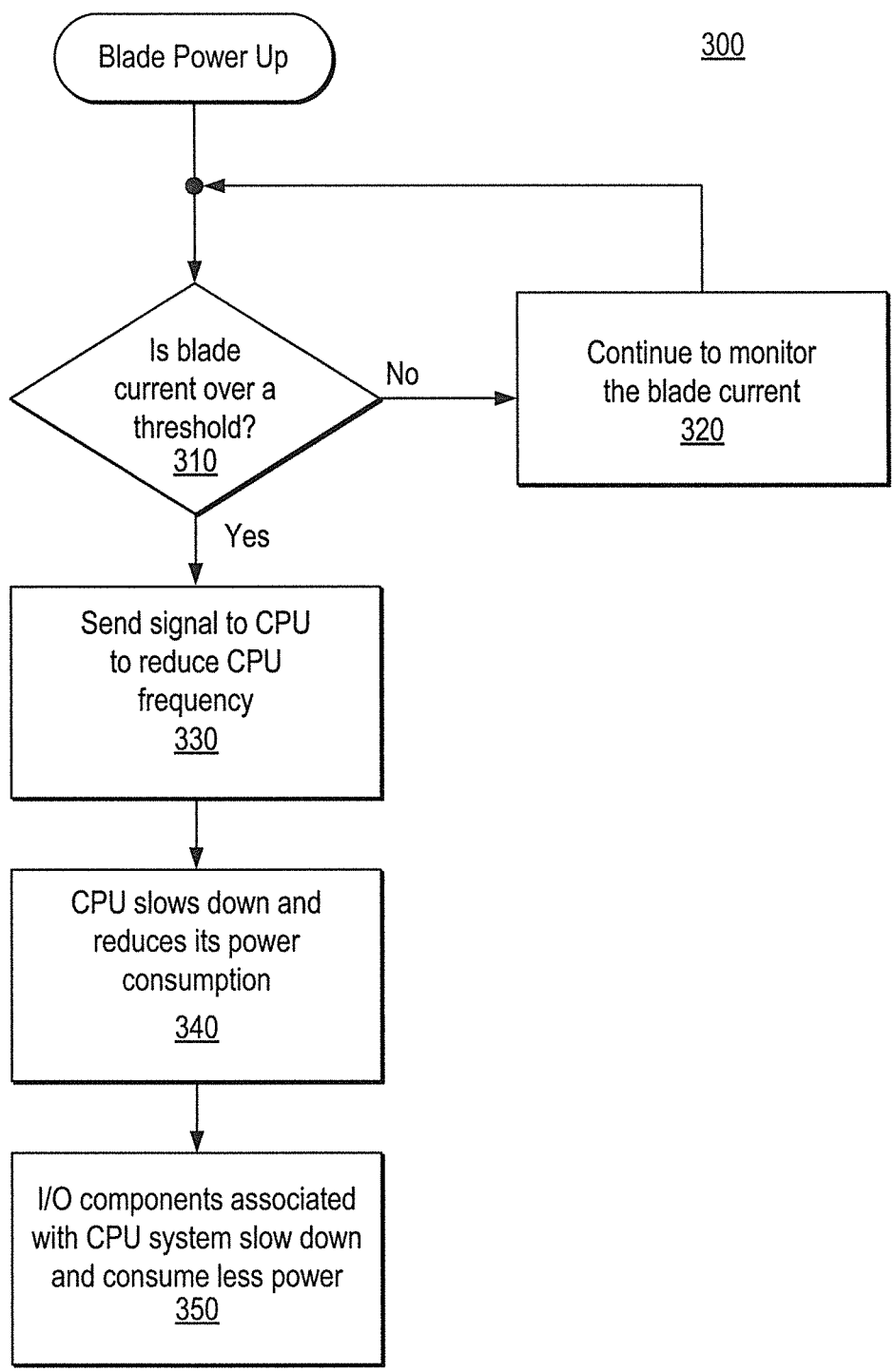
FIG. 3 shows a flow diagram of a method of decreasing a processor frequency if the current drawn by a blade exceeds a threshold.

FIG. 3 is a flow diagram showing a method of protecting the fuse by instructing the CPU 130 to operate at a lower frequency mode if the current sensed by the current sensor exceeds a certain threshold.

At 300 the blade is powered up. At 310 the microcontroller determines if the current drawn by the blade (as sensed by the current sensor) exceeds a threshold. If the current threshold is not exceeded then the microcontroller continues to monitor the current at 320. If the threshold is exceeded then at 330 the microcontroller sends a signal to the CPU to change to a low frequency mode. The signal may be sent along the second communication line 122 and may for example be a prochot signal sent to a prochot pin of the CPU. At 340, in response to receiving the signal from the microcontroller, the CPU is 'throttled' i.e. it slows down to a low frequency mode. This has the effect of reducing the power consumption of the CPU. Further, as indicated at 350, the CPU slowing down also indirectly reduces the power consumption of components associated with the CPU, such as I/O devices which process input and output from the CPU. Afterwards the microcontroller may continue to monitor the current drawn by the blade and may signal the CPU to increase its frequency again if the current drops below the threshold.

The prochot signal causes the CPU to reduce its frequency and may cause the CPU to operate at its minimum (lowest) operating frequency. In one example the communication line 122 connects an output of the logic circuitry 120 to a prochot pin of the CPU and a signal with a logic value of 0 causes the CPU to slow down to its minimum speed, while a signal with a logic value of 1 causes the CPU to operate normally. By operate normally it is meant that the CPU operates at a predetermined 'normal' operating frequency, or if a range of operating frequencies are possible, then an operating frequency determined by the CPU according to its temperature, workload and other conditions.

The current threshold of FIG. 3 is one above which the fuse may be damaged. Determining an appropriate threshold involves several considerations. Firstly the fuse will have a current rating which is determined by standardized tests. Hereinafter the 'current rating' of the fuse, is referred to as the 'fuse rating'. The fuse rating assumes a particular specified voltage (e.g. 12 V) and indicates that, under ideal conditions and at the specified voltage, the fuse will tolerate currents at or below the fuse rating. If a current considerably higher than the fuse rating passes through the fuse (e.g. double the fuse rating or more, as may occur in a short circuit), then the fuse will blow.

However, in a low overload situation, where the fuse rating is exceeded by less than say 35%, the behavior of the fuse is uncertain and difficult to predict. Rather than blowing immediately, the fuse suffers slow incremental damage and is liable to blow at an unpredictable time in the future. In one example, one type of fuse may pass a current at 110% of the fuse rating for as long as 100 hours, while at 135% the lifetime may be anywhere between 0.75 seconds and 10 minutes.

Further, the fuse rating is determined by a standardized test under ideal conditions. The performance of a fuse in practice, may be different due to contacts, welding, temperature and humidity different from the test conditions. There is also a margin of error in the expected voltage and current levels in an apparatus due to variation in components from their stated values. Thus one approach is not to expose a fuse to currents of more than a de-rated fuse rating, where derated fuse rating=fuse rating*(1−D1−D2), where D1 is the fuse de-rating factor at 25 degrees Celsius and D2 is the temperature de-rating factor for the fuse. If the fuse rating is determined according to the UL 248 standard, then D1 is 0.25, while if the fuse current rating is determined according to the IEC 60269 standard then D1 is 0. The temperature de-rating factor depends upon the fuse in question and can be found by comparing the expected temperature to a de-rating curve for the fuse which may be provided by the fuse manufacturer.

In one example the fuse has a 12 A rating according to the UL 248 standard. At 25 degrees Celsius the maximum recommended safe current is thus 12*(1−0.25)=9 A. However, the fuse is expected to reach a temperature of about 55 degrees Celsius and consulting the fuse manufacturer's specifications indicates that the temperature de-rating factor at 55 degrees Celsius is 0.0375. Thus the recommended safe current is 12*(1−0.25−0.0375)=8.55 A. Thus a threshold for reducing the CPU speed may be set at 8.55 A or perhaps 8.5 A rounding down for additional safety. Put another way this is about 70% of the fuse rating.

Furthermore, it needs to be borne in mind that the blade may have a number of power drawing components and the workload of each component may vary. Thus the total current drawn by a blade will often vary over time.

Thus determining an appropriate threshold is a complex matter. In general the threshold is based on the fuse rating. We refer in the following discussion to a current threshold, although it is to be understood that this implies a corresponding power threshold as the power is given by the current multiplied by the voltage (and the operating voltage of the blade is generally constant).

To give a more specific example, the current threshold may be a value selected from the range 65%-105% of the fuse rating. In one example the threshold is a value selected from the range 70%-100% of the fuse rating. In terms of a power threshold this may be expressed as a power threshold determined according to the equation:—

$$P_B = V_B * X * I_F$$

where $P_B$ is the power threshold, $I_F$ is the current rating of the fuse, $V_B$ is the operating voltage of the blade and X is a value selected from the range 0.65 to 1.05, or in the latter case X is a value selected from the range 0.70 to 1.

While prochot has been described above as one example of controlling the CPU speed, however other methods or protocols may be used, for example I2C, SPI etc. The logic circuitry may use just one method or protocol, or a number of methods or protocols. Where the logic circuitry is configured to use more than one method or protocol for controlling the speed of the processor, it may do so using the same communication line for all the methods or protocols, or a different physical communication line for each method or protocol.

When a CPU operates 'normally' it may operate at a predetermined 'normal' operating frequency, or if a range of operating frequencies are possible, then an operating frequency determined by the CPU according to its temperature, workload and other conditions. There may be a plurality of possible operating frequencies each with an associated power consumption (with higher frequencies corresponding to higher power consumption). Thus there may be a minimum operating frequency, a maximum operating frequency and one or more other operating frequencies in between the minimum and maximum.

In one example, rather than simply pushing the CPU to the minimum operating frequency the logic circuitry may send a signal which causes the CPU to reduce its operating frequency without necessarily going all the way down to the minimum operating frequency. Further, in some implementations the operating frequency of the CPU may be controlled in a more graduated manner to ensure that the total power drawn by the blade does not exceed a certain level. For example the operating frequency may be gradually reduced as the current drawn by the blade rises. In this case there may for example be a plurality of current thresholds and the operating frequency of the processor may be dynamically decreased each time the current sensed by the current sensor exceeds one of said current thresholds and increased each time the current sensed by the current sensor goes below one of said current thresholds. Thus where the total current is the sum of the CPU current and the current to other components (such as switching chip), if the current to other components increases the total current drawn by the blade will increase accordingly. In response the logic circuitry may act to reduce the CPU speed and thus CPU current to compensate so that the total current drawn by the blade is kept within a safe limit.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A computing device comprising:
   a chassis having a power supply and a plurality of fuses;
   a plurality of blades placed in the chassis, wherein each of the plurality of blades is connected to the power supply via a respective one of the plurality of fuses, and
   wherein each of the plurality of blades includes a processor, a current sensor to detect a current drawn by the blade, and logic circuitry to send a signal to the processor to reduce an operating frequency of the processor if the current detected by the current sensor exceeds a current threshold, said current threshold being a threshold above which the respective fuse connected to the blade is rated to be damaged.

2. The computing device of claim 1, wherein each of the plurality of fuses has a current rating based on a standardized test and the current threshold is a value selected in a range of 65-105% of the current rating of the fuse.

3. The computing device of claim 1, wherein the current threshold is a selected value equal to L plus or minus 5%, where L=current rating of fuse*[1−D1−D2], where D1 is a de-rating factor for the fuse and D2 is a temperature de-rating factor for the fuse.

4. The computing device of claim 1, wherein the signal is a prochot signal.

5. The computing device of claim 1, wherein, in each of the plurality of blades, the logic circuitry is to send a signal to the processor to cause the processor to reduce the operating frequency to a minimum operating frequency when the current detected by the current sensor exceeds said current threshold.

6. The computing device of claim 1, wherein the logic circuitry in each of the plurality of blades has a plurality of current thresholds and is to dynamically decrease the operating frequency of the processor each time the current sensed by the current sensor exceeds one of the plurality of current thresholds and to increase the operating frequency of the processor each time the current detected by the current sensor goes below one of the plurality of current thresholds.

7. A computing device comprising a chassis having a power supply and a plurality of fuses, a plurality of blades placed in the chassis, wherein each of the plurality of fuses is connected between a respective one of the plurality of blades and the power supply, each of the plurality of blades comprising:
   a CPU;
   a current sensor to sense a current drawn by the blade; and
   logic circuitry to dynamically adjust a running power of the CPU by adjusting an operating frequency of the CPU based on the current sensed by the current sensor so that a total power drawn by the blade does not exceed a power threshold above which the respective fuse connected to the blade is rated to be damaged, said power threshold being based on a current rating of the respective fuse.

8. The computing device of claim 7, wherein said power threshold associated with each of the plurality of blades is determined according to the equation:

$$P_B = V_B * X * I_F$$

where $P_B$ is the power threshold, X is a value selected from the range from 0.65 to 1.05, and
$I_F$ is the current rating of the fuse and $V_B$ is an operating voltage of the blade.

9. The computing device of claim 8, wherein X is a value selected from a range between 0.70 and 1.

10. The computing device of claim 7, wherein each of the plurality of blades has network routing or switching functionality and comprises a switching chip, a routing table and a plurality of network communication ports.

11. The computing device of claim 7, wherein, in each of the plurality of blades, the logic circuitry is to cause the CPU to run at a lower frequency by sending a signal to a pin of the CPU.

12. The computing device of claim 11, wherein the signal is a prochot signal.

13. The computing device of claim 11, wherein the signal is to cause the CPU to operate at a minimum operating frequency.

14. The computing device of claim 11 wherein the signal is to cause the CPU to operate at one of a plurality of operating frequencies depending on the current sensed by the current sensor, said plurality of operating frequencies comprising a minimum frequency, a maximum frequency and at least one other frequency.

15. A method of protecting a fuse in a computing system, wherein the computing system comprises a chassis having a power supply and a plurality of fuses, and a plurality of blades placed in the chassis, wherein each of the plurality of blades is connected to the power supply via a respective one of the plurality of fuses, the method comprising:
  detecting a current drawn by a processor in each of the plurality of blades;
  determining whether the current drawn by the processor in the respective blade exceeds a current threshold, the current threshold being a threshold above which the fuse associated with the respective blade is rated to be damaged;
  causing the processor in the respective blade to run at a lower speed in response to a determination that the current drawn by the processor exceeds the current threshold.

16. The method of claim 15, wherein the current threshold is selected in a range between 65% and 105% of a current rating of the fuse, wherein the current rating of the fuse is determined by a standardized test.

17. The method of claim 15, wherein the processor in the respective blade is caused to run at a lower speed by use of a prochot signal.

18. The method of claim 15, wherein each of the plurality of blades includes a plurality of current thresholds, and the method further comprises:
  decreasing an operating frequency of the processor in each of the plurality of blades each time the current drawn by the processor exceeds one of the plurality of current thresholds; and
  increasing the operating frequency of the processor in each of the plurality of blades each time the current drawn by the processor falls below one of the plurality of current thresholds.

19. The method of claim 15, wherein each of the plurality of blades comprises a plurality of power drawing components other than the processor, and the total power drawn by the respective blade is equal to a sum of the power drawn by the processor and the plurality of other power drawing components.

20. The method of claim 19, wherein the processor in each of the plurality of blades is to operate at any of a plurality of speeds including a maximum speed, a minimum speed and at least one other speed, and wherein the method comprises determining a highest speed at which the processor is to safely operate without causing the total power drawn by the blade to exceed a power threshold at which a total current drawn by the blade will damage the fuse.

* * * * *